United States Patent [19]

McCaslin et al.

[11] Patent Number: 4,763,314
[45] Date of Patent: Aug. 9, 1988

[54] LINEAR ACTUATOR FOR AN OPTICAL DISK STORAGE APPARATUS

[75] Inventors: Martin J. McCaslin, Pleasanton; John C. Kolar, Palo Alto, both of Calif.

[73] Assignee: Optimem, Mt. View, Calif.

[21] Appl. No.: 896,392

[22] Filed: Aug. 13, 1986

[51] Int. Cl.⁴ ............................................. G11B 17/00
[52] U.S. Cl. ................................... 369/249; 369/215; 369/43
[58] Field of Search ............... 369/32, 219, 249, 100, 369/270, 44, 45, 46; 360/59, 66; 350/486

[56] References Cited

U.S. PATENT DOCUMENTS

| | | | |
|---|---|---|---|
| 3,254,897 | 6/1966 | Holmes | 369/249 |
| 4,386,823 | 6/1983 | Musha | 350/247 |
| 4,414,594 | 11/1983 | Farmer et al. | 360/106 |
| 4,504,935 | 3/1985 | Jansen | 369/32 |
| 4,554,653 | 11/1985 | Malissin et al. | 369/45 |
| 4,561,081 | 12/1985 | Janssen et al. | 369/45 |
| 4,613,962 | 9/1986 | Inoue et al. | 369/44 |
| 4,698,798 | 10/1987 | Faber et al. | 369/249 |

Primary Examiner—William M. Shoop, Jr.
Assistant Examiner—Brian Young
Attorney, Agent, or Firm—Baker, Maxham & Jester

[57] ABSTRACT

A linear actuator for controlling access to a track element belonging to a plurality of adjacent track elements arranged in a reference surface of an optical disk rotatable about a spindle. The linear actuator includes an objective lens for projecting a light spot for interaction with a selected one of the track elements. A first moving mechanism is provided for supporting the objective lens for movement along a first direction substantially perpendicular to the reference surface for controlling the focusing of the light spot. A second moving mechanism in the linear actuator supports the objective lens for movement along a second direction substantially parallel to the reference surface and generally transverse to the track elements for controlling the access thereto. The second moving mechanism includes a pair of spaced apart, parallel rods which extend generally transverse to the track elements. The rods have a round cross-section and are made of a ferromagnetic material. The objective lens is supported by a carriage which is engaged with the rods for movement along the same. A pair of round actuator coils are connected to the carriage and surround corresponding ones of the rods for linear movement along the same. Each rod is partially surrounded by a generally C-shaped radially polarized permanent magnet so as not to obstruct movement of the carriage along the rod. A return flux path is provided adjacent each of the magnets.

14 Claims, 5 Drawing Sheets

LINEAR ACTUATOR FOR AN OPTICAL DISK STORAGE APPARATUS

BACKGROUND OF THE INVENTION

The present invention relates generally to computer peripheral storage apparatus, and more particularly, to an improved linear actuator for reciprocably positioning an objective lens actuator assembly relative to a rotating optical disk on which information is recorded.

Both magnetic and optical disk storage devices have been used as peripheral equipment for computers. In these devices, the disk is typically rotated at a uniform speed and a magnetic head or laser-focusing objective assembly is reciprocated by a linear actuator in a radial direction in order to select a particular data track.

Most linear actuators used for accessing tracks of a memory disk are of the moving coil, fixed magnetic circuit type. Referring to FIG. 1 herein, a typical linear actuator comprises a magnetic circuit 10, a wheeled carriage 12, a coil 14 mounted to the carriage and slideable linearly over the pole or stator of the magnetic circuit, and guide rods such as 16 over which the wheeled carriage rides. A payload 18 is supported by the carriage for reciprocal linear movement in a radial direction relative to a rotating disk 20 supported by a spindle 22. Where the disk is the magnetic type, the payload comprises a read/write head which is positioned very close to the surface of the rotating disk. Where the disk is the optical type, the payload comprises an objective lens actuator assembly for focusing a laser beam on a particular spot on the disk in order to read the same.

In a typical linear actuator, it is desirable to minimize the clearance between the magnetic pole and the moving coil bobbin in order to optimize the magnetic flux in the air gap and thereby maximize the driving force and minimize access time. In order to guarantee accuracy of the coil bobbin-to-pole relationship, it is necessary to precisely control the location and angularity of the carriage and rods relative to the magnetic circuit to ensure even distribution of clearances nominally over the entire stroke of the linear actuator. The mechanical parts of a typical linear actuator must therefore be manufactured to very close tolerances at considerable cost.

Another drawback of conventional linear actuators is that they take up an undesirably large amount of the space available in the physical envelope allowed for the disk drive. This is especially true where the disk drive is constructed to meet the computer industry standard five and one-quarter inch form factor, i.e. a rectangular volume measuring three and one-quarter inches in height by five and three-quarter inches in width by eight inches in length. In an optical disk drive, it is desirable to reserve the space behind the carriage, normally occupied by the magnetic circuit for the fixed optics. Furthermore, in an optical disk drive where the optics are divided into fixed and movable portions, alignment of the optical axis to the axis of travel of the carriage becomes critical.

U.S. Pat. Nos. 4,414,594; 4,504,935; and 4,554,653 disclose relevant linear actuators.

SUMMARY OF THE INVENTION

It is therefore the primary object of the present invention to provide an improved linear actuator for an optical disk drive.

The illustrated embodiment of the present invention comprises a linear actuator for controlling access to a track element belonging to a plurality of adjacent track elements arranged in a reference surface of an optical disk rotatable about a spindle. The linear actuator includes an objective lens for projecting a light spot for interaction with a selected one of the track elements. A first moving mechanism is provided for supporting the objective lens for movement along a first direction substantially perpendicular to the reference surface for controlling the focusing of the light spot. A second moving mechanism in the linear actuator supports the objective lens for movement along a second direction substantially parallel to the reference surface and generally transverse to the track elements for controlling the access thereto. The second moving mechanism includes a pair of spaced apart, parallel rods which extend generally transverse to the track elements. The rods have a round cross-section and are made of a ferromagnetic material. The objective lens is supported by a carriage which is engaged with the rods for movement along the same. A pair of round actuator coils are connected to the carriage and surround corresponding ones of the rods for linear movement along the same. Each rod is partially surrounded by a generally C-shaped radially polarized permanent magnet so as not to obstruct movement of the carriage along the rod. A return flux path is provided adjacent each of the magnets.

Our linear actuator is compact in size and is capable of rapidly and accurately positioning the objective lens for accessing a particular track. The linear driving force is optimized by the combination of circular rods which function as pole pieces, surrounding round coils which are closely adjacent the rods, and C-shaped magnets which are closely adjacent the coils and partially surround the same. Compactness results from using the rods as guide tracks for the carriage which supports the objective lens.

DESCRIPTION OF THE PREFERRED EMBODIMENT

Figure 1:
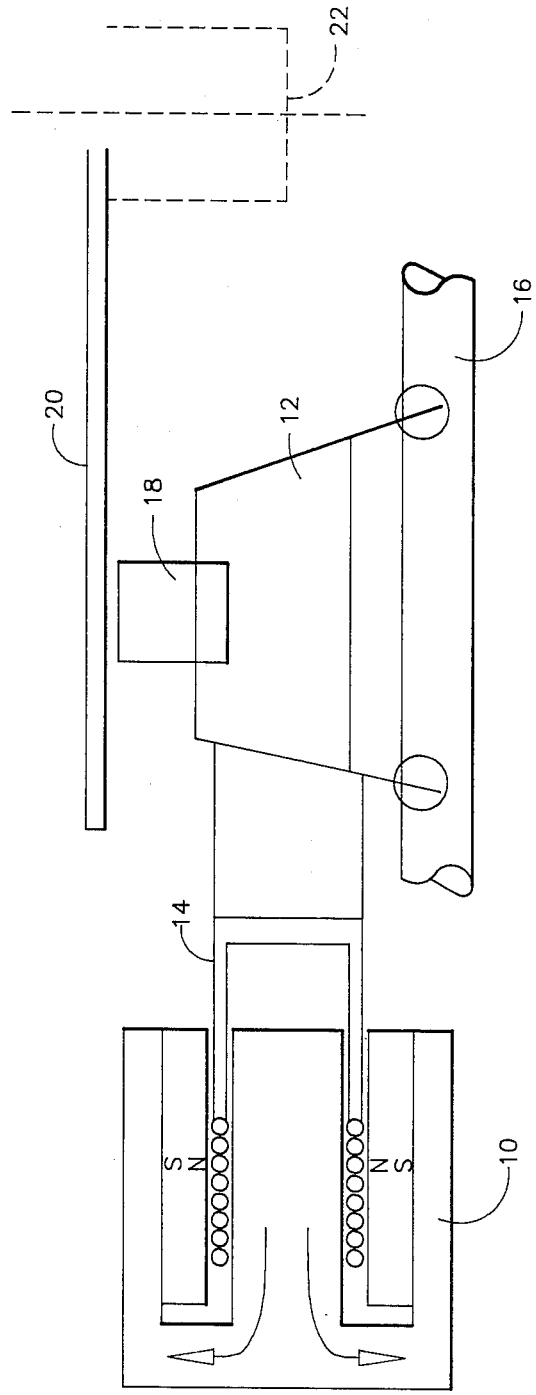
FIG. 1 is a simplified diagram of a conventional linear actuator in a disk storage device.
Figure 2:
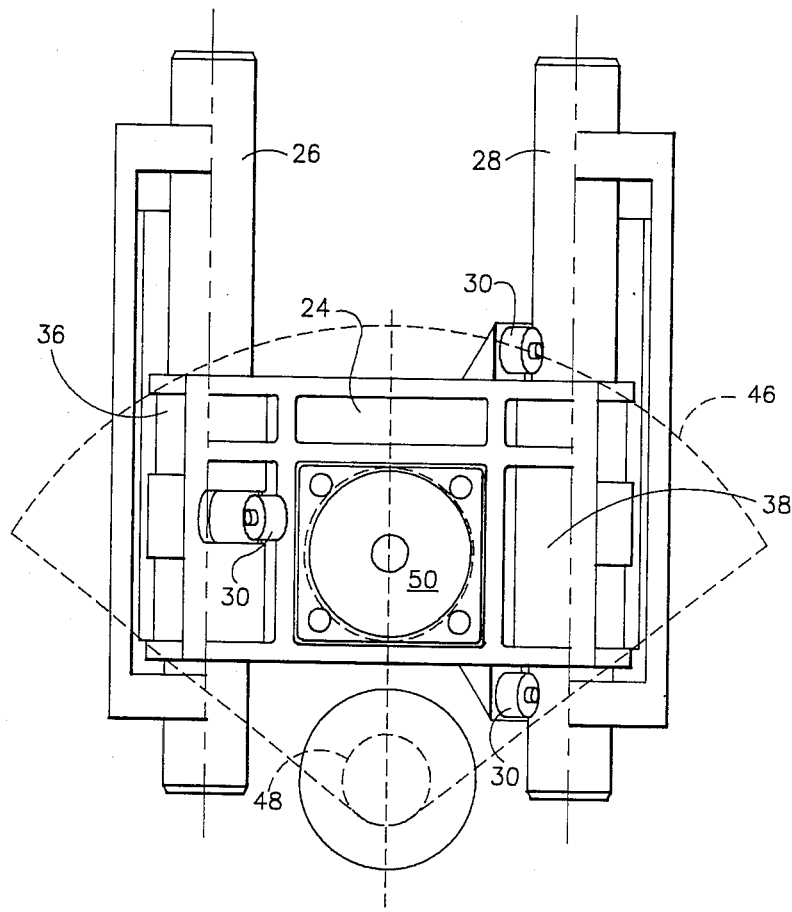
FIG. 2 is a top plan view of a preferred embodiment of our invention. A sector of the optical disk is illustrated in phantom lines.
Figure 3:
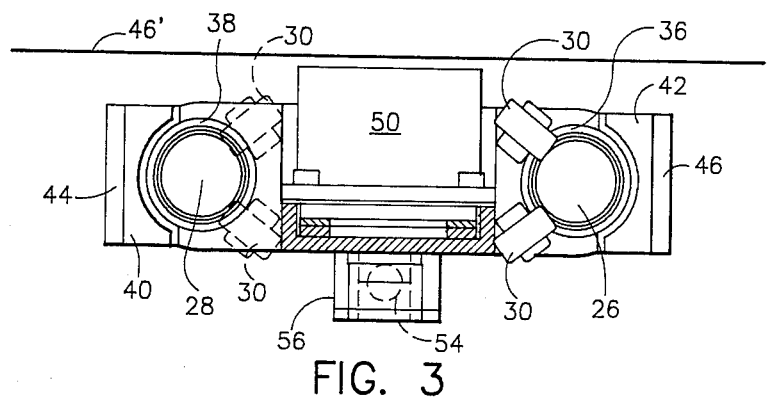
FIG. 3 is an end elevation view of the preferred embodiment of our invention taken from the top of FIG. 2 with portions of the carriage broken away to show the mounting of the objective lens actuator assembly.

FIGS. 2 and 3 illustrate a preferred embodiment of our linear actuator. So as to minimize the magnetic air gap dimensions, minimize the number of parts and their required accuracies, and consequently the cost of the actuator assembly, the guidance system for the carriage 24 is integral to the magnetic circuit. The guidance function is supplied by elongate circular steel rods 26 and 28 which straddle the carriage and on which six carriage wheels 30 on the primary side and on the secondary side and disposed between the rods can roll with ninety degree contact. The rods are made of a ferromagnetic material in order to function as inner poles hereafter explained. The rods 26 and 28 have sufficient length to accommodate the required data the accessing stroke. The ends of the rods are supported by a base structure 32, utilizing vertical ninety degree recesses 34. The rods may be affixed to the base structure 32 by clips (not illustrated). One wheel 30 of the carriage 24 on the secondary side is spring loaded to take up any freedom in lateral movement that would otherwise exist. Alternatively, fixed wheels and a preloaded secondary rod may also be used.

Figure 4:
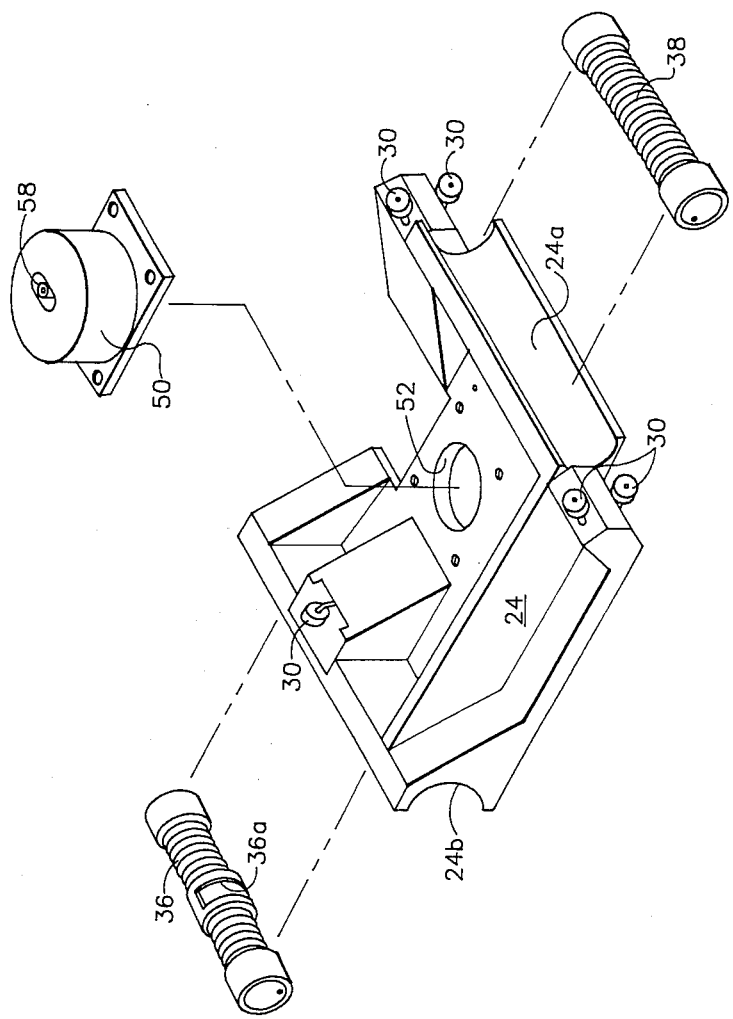
FIG. 4 is an exploded perspective view of a portion of the preferred embodiment illustrating the mounting of the objective lens actuator assembly and the coils to the carriage frame.

The drive means for the carriage makes use of the rods 26 and 28 acting as center poles to complete a magnetic circuit around circular coils 36 and 38 (FIGS. 2-5) which are rigidly attached to the carriage 24. The coils fit in corresponding curved receptacles 24a and 24b (FIG. 4) in the sides of the carriage. The coil 36 has an aperture 36a intermediate its length to permit the wheels 30 on that side of the carriage to engage the rod 26 therethrough. Each coil consists of an insulative cylinder with wire wrapped around the same. The coils are dimensioned to slide longitudinally over corresponding ones of the rods in close proximity thereto but without any contact therebetween.

Figure 5:
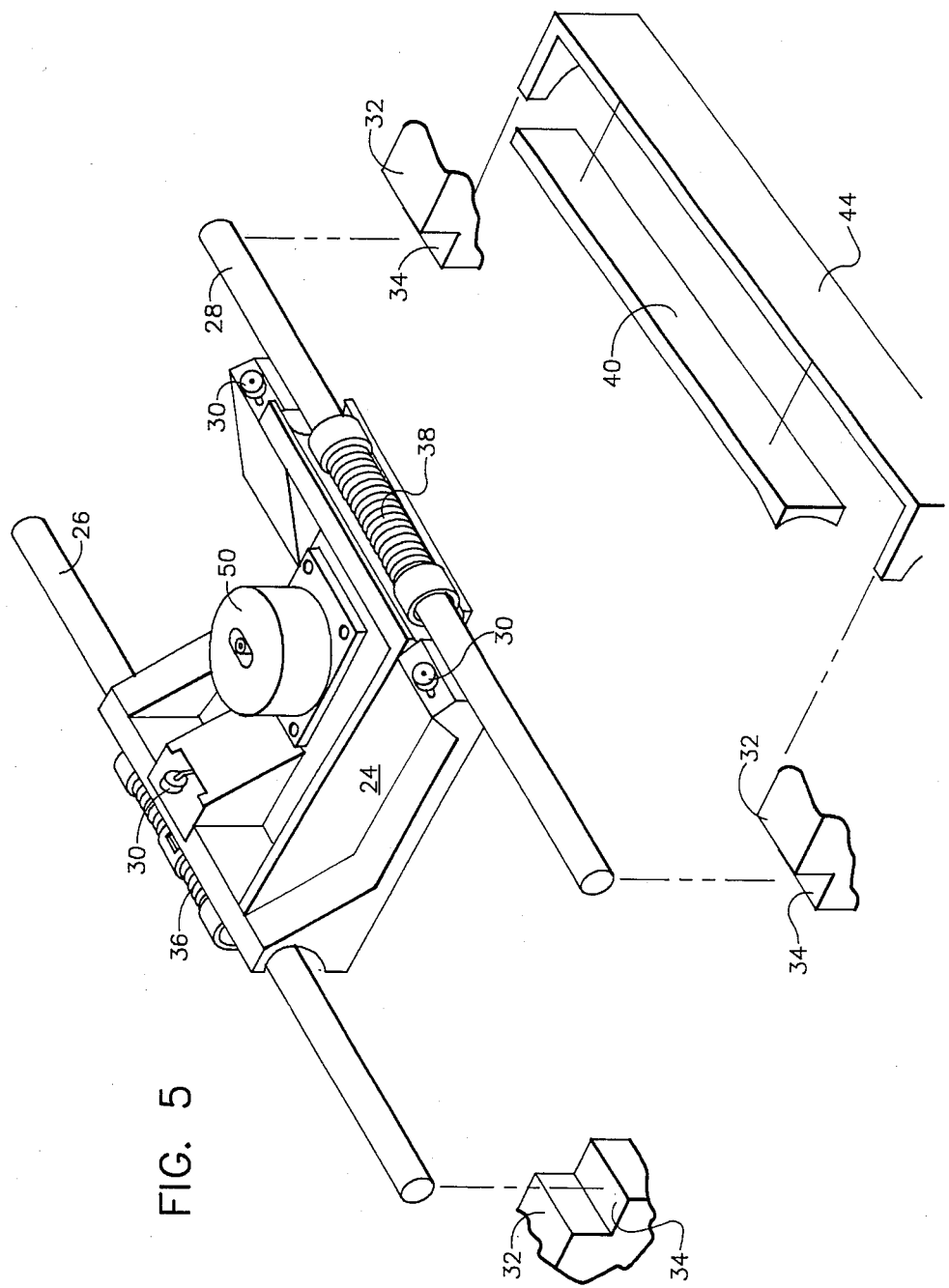
FIG. 5 is an exploded perspective view of the preferred embodiment illustrating the mounting of the rods that serve as guide tracks for the carriage, along with the mounting of one of the C-shaped magnets and its associated outer pole piece.
Figure 6:
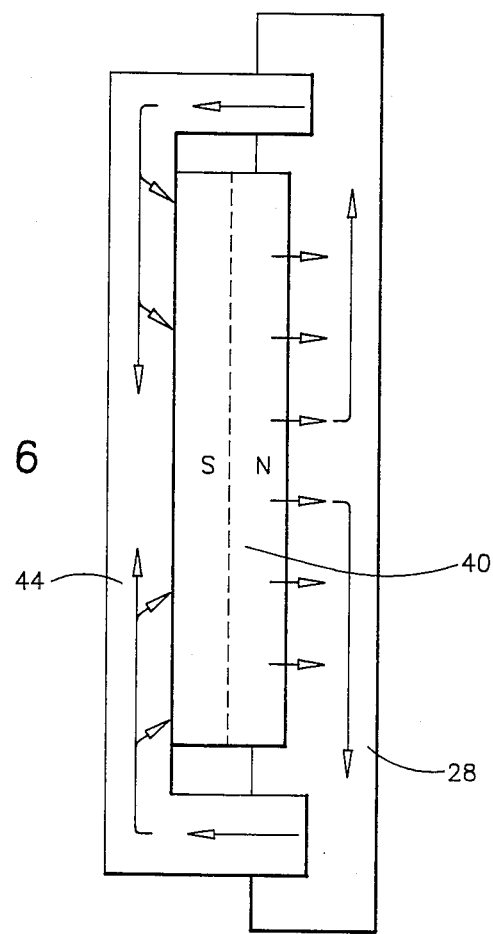
FIGS. 6 and 7 are simplified top plan and end views, respectively, of the magnetic circuit of the preferred embodiment illustrating the flux path.
Figure 7:
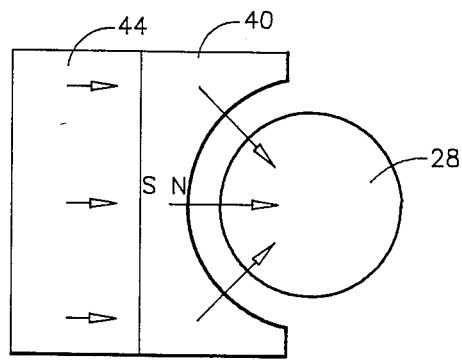

C-shaped radially polarized permanent magnets 40 and 42 (FIGS. 3 and 5) partially surround the coils 36 and 38. Outer poles 44 and 46 extend parallel to and in contact with the C-shaped magnets 40 and 42. The outer poles 44 and 46 have legs at each end that attach magnetically, with or without fasteners, to the ends of their respective rods 26 and 28 as best seen in FIGS. 2 and 5. Referring to FIGS. 6 and 7, the flux loop (indicated by the arrows) flows out of the radially polarized permanent magnet 40 to the rod 28, splitting at the rod center out to the ends and returning via the outer pole 44. The flux path is similar for rod 26, C-shaped magnet 42 and outer pole 46.

The active portions of coils 36 and 38, being wound perpendicular to the flux, develop the linear drive forces for the carriage when energized. The efficiency of the linear actuator is maximized by the use of the curved C-shaped magnets 42 and 44 which can enclose and render active up to one-hundred and eighty degrees or more of the coils 36 and 38. Preferably, the C-shaped magnets surround between one-hundred twenty and one-hundred eighty degrees of the circumference of their corresponding coils. Another advantage, as shown in FIG. 2, is that almost the entire linear actuator fits into the space directly under the data band of the memory disk 46 rotatably supported by a spindle 48. The carriage is dimensioned to fit within the width of the data band. This leaves the space adjacent to, and in back of, the disk available for other components.

An objective lens actuator assembly 50 (FIGS. 2-5) is mounted on the center portion of the carriage 24 above an aperture 52 (FIG. 4) therethrough. A laser beam from a stationary source (not illustrated) mounted to the base extends horizontally and enters the assembly 50 through a port 54 (FIG. 3) in the lower cylindrical portion 56 of the assembly 50. The objective lens actuator assembly has a mirror and internal mechanisms for moving an objective lens toward or away from the plane 45' of the optical disk. The lens is moved in a direction perpendicular to the plane of the disk for focusing the laser beam into a spot on a selected one of the a plurality of concentric or spiral tracks arranged in a reference surface of the disk. The laser beam is emitted from an element 58 (FIG. 4) in the top of the assembly. It then strikes the optical disk and reflects back into the assembly 50. One suitable objective lens is the Model TAOHS-PE commercially available from Olympus Optical Co. Ltd., Tokyo, Japan. See also U.S. Pat. No. 4,386,823 of Musha, entire disclosure of which in incorporated herein by reference.

Having described a preferred embodiment of our linear actuator, it will be apparent to those skilled in the art that our invention may be modified in arrangement and detail. Accordingly, the protection afforded our invention should only be limited in accordance with the following claims.

We claim:

1. A linear actuator for controlling access to a track element belonging to a plurality of adjacent track elements arranged in a reference surface of an optical disk rotatable about a spindle, comprising:
   objective lens means for projecting a light spot for interaction with a selected one of the track elements;
   first means for supporting the objective lens means for movement along a first direction substantially perpendicular to the reference surface for controlling the focusing of the light spot;
   second means for supporting the objective lens means for movement along a second direction substantially parallel to the reference surface and generally transverse to the track elements for controlling the access thereto, including a pair of spaced apart, parallel rods made of a ferromagnetic material, the rods having a round cross-section and extending generally transverse to the track elements, and a carriage supporting the object lens means and having a plurality of wheels positioned between and engaged with the rods for movement along the same;
   a pair of round actuator coils connected to the carriage and surrounding corresponding ones of the rods;
   a pair of generally C-shaped radially polarized permanent magnets each extending along and partially surrounding a corresponding one of the rods so as not to obstruct movement of the carriage therealong; and
   means adjacent each of the magnets for providing a return flux path.

2. A linear actuator according to claim 1 wherein each C-shaped permanent magnet surrounds between approximately one-hundred twenty degrees and one-hundred eighty degrees of a circumference of its corresponding coil.

3. A linear actuator according to claim 1 wherein the return flux means comprises a pair of outer pole pieces each extending adjacent to a corresponding one of the permanent magnets.

4. A linear actuator according to claim 1 wherein the wheels are arranged in three separate groups, two of said groups being rotatably mounted to a first side of the carriage for engagement with a first one of the rods and the remaining group being rotatably mounted to a second side of the carriage for engagement with a second one of the rods.

5. A linear actuator according to claim 1 wherein the carriage is dimensioned to substantially fit within a width of a data band of the optical disk.

6. A linear actuator according to claim 1 wherein the wheels are arranged in corresponding pairs which engage a corresponding roller at ninety degree spaced locations about the same.

7. A linear actuator according to claim 1 wherein the objective lens means and the first means for supporting and moving the objective lens means along a first direction comprise an objective lens actuator assembly mounted on the carriage.

8. A linear actuator according to claim 1 wherein the carriage is formed with a pair of curved receptacles on opposite sides thereof for each receiving and holding a corresponding one of the coils.

9. A linear actuator according to claim 1 and further comprising a base structure having recesses for receiving and holding the opposite ends of the rods.

10. A linear actuator for controlling access to a track element belonging to a plurality of adjacent track elements arranged in a reference surface of an optical disk rotatable about a spindle, comprising:

objective lens means for projecting a light spot for interaction with a selected one of the track elements;

first means for supporting the objective lens means for movement along a first direction substantially perpendicular to the reference surface for controlling the focusing of the light spot;

second means for supporting the objective lens means for movement along a second direction substantially parallel to the reference surface and generally transverse to the track elements for controlling the access thereto, including a pair of spaced apart, parallel rods made of a ferromagnetic material, the rods having a round cross-section and extending generally transverse to the track elements, and a carriage supporting the objective lens means and having a plurality of wheels positioned between and engaging the rods, said wheels arranged in three separate groups, two of said groups being rotatably mounted to a first side of the carriage for engagement with a first one of the rods and the remaining group being rotatably mounted to a second side of the carriage for engagement with a second one of the rods for movement along the same;

a pair of round actuator coils connected to the carriage and surrounding corresponding ones of the rods;

a pair of generally C-shaped radially polarized permanent magnets each extending along and surrounding between approximately one-hundred twenty degrees and one-hundred eighty degrees of a circumference of its corresponding coil so as not to obstruct movement of the carriage along the rods; and return flux means including a pair of outer pole pieces each extending adjacent to a corresponding one of the permanent magnets for providing a return flux path.

11. A linear actuator according to claim 10 wherein the carriage is dimensioned to substantially fit within a width of a data band of the optical disk.

12. A linear actuator according to claim 11 wherein the wheels are arranged in corresponding pairs which engage a corresponding rod at ninety degrees spaced locations about the same.

13. A linear actuator according to claim 12 wherein the carriage is formed with a pair of curved receptacles on opposite sides thereof for each receiving and holding a corresponding one of the coils.

14. A linear actuator for controlling access to a track element belonging to a plurality of adjacent track elements arranged in a reference surface of an optical disk rotatable about a spindle, comprising:

objective lens means for projecting a light spot for interaction with a selected one of the track elements;

first means for supporting the objective lens means for movement along a first direction substantially perpendicular to the reference surface for controlling the focusing of the light spot;

second means for suporting the objective lens means for movement along a second direction substantially parallel to the reference surface and generally transverse to the track elements for controlling the access thereto, including a pair of spaced apart, parallel rods made of a ferromagnetic material, the rods having a round cross-section and extending generally transverse to the track elements, and a carriage supporting the objective lens means and being dimensioned to substantially fit within a data band of the optical disk, the carriage having a plurality of wheels positioned between said engaging the rods, said wheels arranged in three separte groups, two of said groups being rotatably mounted to a first side of the carriage for engagement with a first one of the rods and the remaining group being rotatably mounted to a second side of the carriage for engagement with a second one of the rods for movement along the same, the wheels being arranged in corresponding pairs which engage a corresponding rod at ninety degree spaced locations about the same, and the carriage further having a pair of curved receptacles formed in opposite sides of said carriage for each receiving and holding a corresponding actuator coil;

a pair of round actuator coils mounted in said receptacles formed in the carriage and surrounding corresponding ones of the rods;

a pair of generally C-shaped radially polarized permanent magnets each extending along and surrounding between approximately one-hundred twenty degrees and one-hundred eight degrees of a circumference of its corresponding coil so as not to obstruct movement of the carriage along the rods; and return flux means including a pair of outer pole pieces each extending adjacent to a corresponding one of the permanent magnets for providing a return flux path.

* * * * *